(12) United States Patent
Sosa et al.

(10) Patent No.: US 9,815,957 B2
(45) Date of Patent: Nov. 14, 2017

(54) FOAMED ARTICLES EXHIBITING IMPROVED THERMAL PROPERTIES

(71) Applicant: FINA TECHNOLOGY, INC., Houston, TX (US)

(72) Inventors: Jose M. Sosa, Deer Park, TX (US); David W. Knoeppel, League City, TX (US)

(73) Assignee: Fina Technology, Inc., Houston, TX (US)

(*) Notice: Subject to any disclaimer, the term of this patent is extended or adjusted under 35 U.S.C. 154(b) by 11 days.

(21) Appl. No.: 14/495,340

(22) Filed: Sep. 24, 2014

(65) Prior Publication Data
US 2015/0011665 A1  Jan. 8, 2015

Related U.S. Application Data

(62) Division of application No. 13/153,776, filed on Jun. 6, 2011, now Pat. No. 8,889,752.

(Continued)

(51) Int. Cl.
*C08J 9/28* (2006.01)
*B29C 44/08* (2006.01)
(Continued)

(52) U.S. Cl.
CPC .............. *C08J 9/28* (2013.01); *B29C 44/08* (2013.01); *C08J 9/0066* (2013.01); *C08J 9/122* (2013.01);
(Continued)

(58) Field of Classification Search
CPC .................................................. C08J 2203/08
See application file for complete search history.

(56) References Cited

U.S. PATENT DOCUMENTS 5,554,660 A * 9/1996 Altieri ..................... C08J 9/125
  521/81
5,616,413 A * 4/1997 Shinozaki ............... C08F 12/08
  428/402

(Continued)

FOREIGN PATENT DOCUMENTS

WO    WO2007149418 A2 * 12/2007

OTHER PUBLICATIONS

Yang, K.; Ozisik, R. Novel route to nanoparticle dispersion using supercritical carbon dioxide. Journal of Supercritical Fluids 43 (2008) 515-523.*

(Continued)

*Primary Examiner* — Mike M Dollinger
*Assistant Examiner* — Christina Wales
(74) *Attorney, Agent, or Firm* — Albert Shung (57) ABSTRACT

Cellular and multi-cellular polystyrene and polystyrenic foams and methods of forming such foams are disclosed. The foams include an expanded polystyrene formed from expansion of an expandable polystyrene including an adsorbent comprising alumina, wherein the multi-cellular polystyrene exhibits a multi-cellular size distribution. The process for forming a foamed article includes providing a formed styrenic polymer and contacting the formed styrenic polymer with a first blowing agent and an adsorbent comprising alumina to form extrusion polystyrene. The process further includes forming the extrusion styrenic polymer into an expanded styrenic polymer and forming the expanded styrenic polymer into a foamed article.

14 Claims, 4 Drawing Sheets

Related U.S. Application Data

(60) Provisional application No. 61/354,012, filed on Jun. 11, 2010.

(51) Int. Cl.
    *C08J 9/00*     (2006.01)
    *C08J 9/12*     (2006.01)

(52) U.S. Cl.
    CPC ........... *C08J 9/125* (2013.01); *C08J 2201/03* (2013.01); *C08J 2203/06* (2013.01); *C08J 2203/10* (2013.01); *C08J 2203/182* (2013.01); *C08J 2205/042* (2013.01); *C08J 2205/044* (2013.01); *C08J 2205/048* (2013.01); *C08J 2325/04* (2013.01); *C08J 2325/06* (2013.01)

(56) References Cited

U.S. PATENT DOCUMENTS

2003/0220408 A1* 11/2003 Hayashi ................. C08J 9/0028
    521/82
2005/0153134 A1* 7/2005 Sasaki ....................... B29B 9/06
    428/402
2005/0218540 A1* 10/2005 Sastry ................... B22F 1/0018
    264/10

OTHER PUBLICATIONS

Taki, K.; Nitta, K.; Kihara, S.I.; Oshima, M. "CO2 Foaming of Poly(ethylene glycol)/Polystyrene Blends: Relationship of the Blend Morphology, CO2 Mass Transfer, and Cellular Structure". J App Poly Sci, vol. 97, 1899-1906 (2005).*

* cited by examiner

FOAMED ARTICLES EXHIBITING IMPROVED THERMAL PROPERTIES

This application is a Divisional of U.S. patent application Ser. No. 13/153,776, filed on Jun. 6, 2011, which is a Non-Provisional of U.S. Provisional Application No. 61/354,012, filed on Jun. 11, 2010.

FIELD

Embodiments of the present disclosure generally relate to polymeric foams and methods of production for polymeric foams. Specifically, embodiments of the present disclosure relate to bi-cellular polystyrene foams and methods of production for multi-cellular polystyrene foams.

BACKGROUND

Polymeric cellular foams have been used in such varied industries as housing and construction, automotive, aerospace, and electronic applications. The cells of the foams can be described as open or closed, small or large. Closed cell foams generally have better thermal insulation efficiency than open cell foams, whereas open cell foams tend to be more permeable than closed cell foams. Small cell foams typically improve the mechanical properties of the foam product, whereas large-cell foams tend to reduce bulk density of the polymeric foam.

A disadvantage of known polymeric foams can be the type of blowing agent used. For instance, traditional chlorofluorocarbon (CFC) or hydrochlorofluorocarbon (HCFC) blowing agents are often viewed unfavorably because their use may result in ozone depletion, may be heavily regulated or banned, and are typically high cost materials.

Therefore, a need exists for polymeric foams that are benign with respect to environmentally hazardous blowing agents.

SUMMARY

Embodiments of the present disclosure include multi-cellular foam structures and processes for forming multi-cellular foam structures.

In one embodiment, a multi-cellular polystyrene is disclosed. The multi-cellular polystyrene includes expanded polystyrene formed from expansion of an expandable polystyrene comprising an adsorbent comprising alumina, wherein the multi-cellular polystyrene exhibits a multi-cellular distribution.

In another embodiment, which may be combined with any other embodiment herein, a process of forming foamed articles is disclosed. The process includes providing a formed styrenic polymer and contacting the formed styrenic polymer with a first blowing agent and an adsorbent comprising alumina to form extrusion polystyrene. The method further includes forming the extrusion styrenic polymer into an expanded styrenic polymer and forming the expanded styrenic polymer into a foamed article.

BRIEF DESCRIPTION OF THE DRAWINGS

The foregoing summary, detailed description, and other aspects of this disclosure will be best understood when read in conjunction with the accompanying drawings, in which.

DETAILED DESCRIPTION

Introduction and Definitions

A detailed description will now be provided. Each of the appended claims defines a separate invention, which for infringement purposes is recognized as including equivalents to the various elements or limitations specified in the claims. Each of the embodiments will now be described in greater detail below, including specific embodiments, versions and examples. This disclosure is not limited to these specific embodiments, versions or examples, which are included to enable a person having ordinary skill in the art to make and use the subject matter of the claims when the disclosure of this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Plastic foam refers to a polymer that has been specially foamed so as to create cells or "bubbles." Plastic foams include microcellular foams having an average cell size on the order of 10 microns in diameter, and typically ranging from about 0.1 to about 100 microns in diameter, and conventional plastic foams with an average cell diameter ranging from about 100 to 900 microns. The average cell diameter is very dependent on the type of blowing agent used to form the cell.

Polymeric foams are used in many applications such as absorbents, insulation, packaging, filters, and cushions. Certain polymeric foams include more than one average cell diameter. Typically, the different average diameters of the cells are formed by different blowing agents. That is, including, for instance, two different blowing agents with two different nucleating mechanisms in the polymeric foam formation process will result in cells with two different average sizes.

In an embodiment, the polymer of the present disclosure includes a styrenic polymer. In another embodiment, the styrenic polymer includes polymers of monovinylaromatic compounds, such as styrene, alphamethyl styrene and ring-substituted styrenes. In an alternative embodiment, the styrenic polymer includes or consists of a homopolymer and/or copolymer of polystyrene. In a further embodiment, the styrenic polymer is polystyrene. In an even further embodiment, styrenic monomers for use in the styrenic polymer composition can be selected from the group of styrene, alpha-methyl styrene, vinyl toluene, p-methyl styrene, t-butyl styrene, o-chlorostyrene, vinyl pyridine, and any combinations thereof.

When blended, the styrenic polymer blend typically contains at least 50 wt % of a styrenic polymer. In another embodiment, the blend contains a styrenic polymer in amounts ranging from 1 to 99 wt %, 50 to 95 wt %, 60 to 92 wt %, and optionally 70 to 90 wt %. In a further embodiment, the blend contains a styrene polymer in amounts ranging from 80 to 99 wt %. In an even further embodiment, the blend contains a styrenic polymer in amounts ranging from 90 to 95 wt %.

The styrenic polymer of the present disclosure may include general-purpose polystyrene (GPPS), high-impact polystyrene (HIPS), styrenic copolymer compositions, or any combinations thereof. In an embodiment, the HIPS contains an elastomeric material. In another embodiment, the HIPS contains an elastomeric phase embedded in the polystyrene matrix, which results in the polystyrene having an increased impact resistance.

In yet another embodiment, the styrenic polymer may be a styrenic copolymer. The styrenic polymer of the present invention may be formed by co-polymerizing a first monomer with a second monomer, and optionally other monomers. The first monomer and the second monomer may be co-polymerized by having the first monomer and the second monomer present in a reaction mixture that is subjected to polymerization conditions. The first monomer may include monovinylaromatic compounds, such as styrene, alpha-methyl styrene and ring-substituted styrenes. In an embodiment, the first monomer is selected from the group of styrene, alpha-methyl styrene, vinyl toluene, p-methyl styrene, t-butyl styrene, o-chlorostyrene, vinyl pyridine, and any combinations thereof. In another embodiment, styrene is used exclusively as the first monomer. The second monomer can be any suitable monomer capable of polymerization to form a styrenic copolymer. Examples of suitable second monomers can include certain acrylates, acetates, esters, ethers, acrylonitriles, and combinations thereof.

The first monomer may be present in the styrenic polymer in any desired amounts. In an embodiment, the first monomer is present in the reaction mixture in amounts of at least 50 wt % of the reaction mixture. In another embodiment, the first monomer is present in the reaction mixture in amounts ranging from 90 to 99.9 wt % of the reaction mixture. In a further embodiment, the first monomer is present in the reaction mixture in amounts ranging from 95 to 99 wt %.

In other embodiments, the polystyrene polymer can include at least one polar or non-polar group. The polymerization of the styrenic monomer, polar or non-polar additive, and any co-monomer may be carried out using any method known to one having ordinary skill in the art of performing such polymerizations. In an embodiment, the polymerization may be carried out by using a polymerization initiator.

In a non-limiting embodiment, either by itself or in combination with any other aspect of the disclosure, the polymerization initiators include radical polymerization initiators. The radical polymerization initiators may include but are not limited to perketals, hydroperoxides, peroxycarbonates, and the like. These radical polymerization initiators may be selected from the group of benzoyl peroxide, lauroyl peroxide, t-butyl peroxybenzoate, and 1,1-di-t-butylperoxy-2,4-di-t-butylcycleohexane, and combinations thereof. In an embodiment, the amount of the polymerization initiator is from 0 to 1.0 percent by weight of the reaction mixture. In another embodiment, the amount of the polymerization initiator is from 0.01 to 0.5 percent by weight of the reaction mixture. In a further embodiment, the amount of the polymerization initiator is from 0.025 to 0.05 percent by weight of the reaction mixture.

Any process capable of processing or polymerizing styrenic monomers may be used to prepare the styrenic co-polymer. In an embodiment, the polymerization reaction to prepare the styrenic co-polymer may be carried out in a solution or mass polymerization process. Mass polymerization, or bulk polymerization, refers to the polymerization of a monomer in the absence of any medium other than the monomers and a catalyst or polymerization initiator. Solution polymerization refers to a polymerization process wherein the monomers and polymerization initiators are dissolved in a non-monomeric liquid solvent at the beginning of the polymerization reaction.

The polymerization may be either a batch process or a continuous process. In an embodiment, the polymerization reaction may be carried out using a continuous production process in a polymerization apparatus including a single reactor or multiple reactors. The styrenic polymer composition can be prepared using an upflow reactor, a downflow reactor, or any combinations thereof. The reactors and conditions for the production of a polymer composition, specifically polystyrene, are disclosed in U.S. Pat. No. 4,777,210, which is incorporated by reference herein in its entirety.

The temperature ranges useful in the polymerization process of the present disclosure can be selected to be consistent with the operational characteristics of the equipment used to perform the polymerization. In an embodiment, the polymerization temperature ranges from 90 to 240° C. In another embodiment, the polymerization temperature ranges from 100 to 180° C. In yet another embodiment, the polymerization reaction may be carried out in multiple reactors in which each reactor is operated under an optimum temperature range. For example, the polymerization reaction may be carried out in a reactor system employing a first polymerization reactor and a second polymerization reactor that may be either continuously stirred tank reactors (CSTR) or plug-flow reactors. In an embodiment, a polymerization process for the production of a styrenic co-polymer of the type disclosed herein containing multiple reactors may have the first reactor (e.g., a CSTR), also referred to as a prepolymerization reactor, operated under temperatures ranging from 90 to 135° C. while the second reactor (e.g. CSTR or plug flow) may be operated under temperatures ranging from 100 to 165° C.

In an alternative embodiment, the polymerization reaction is one in which heat is used as the initiator. In a further embodiment, the polymerization is performed using a non-conventional initiator such as a metallocene catalyst as is disclosed in U.S. Pat. No. 6,706,827 to Lyu, et al., which is incorporated herein by reference in its entirety. In one embodiment, the monomer(s) may be admixed with a solvent and then polymerized. In another embodiment, one of the monomers is dissolved in the other and then polymerized. In still another embodiment, the monomers may be fed concurrently and separately to a reactor, either neat or dissolved in a solvent, such as ethyl benzene or toluene. In yet another embodiment, a second monomer may be prepared in-situ or immediately prior to the polymerization by admixing the raw material components, such as an unsaturated acid or anhydride and a metal alkoxide, in-line or in the reactor. Any process for polymerizing monomers having polymerizable unsaturation known to be useful to those of ordinary skill in the art in preparing such polymers may be used. For example, the process disclosed in U.S. Pat. No. 5,540,813 to Sosa, et al., may be used and is incorporated herein by reference in its entirety. The processes disclosed in U.S. Pat. No. 3,660,535 to Finch, et al., and U.S. Pat. No. 3,658,946 to Bronstert, et al., may be used and are both incorporated herein by reference in their entirety. Any process for preparing general purpose polystyrene may be used to prepare the styrenic co-polymer of the present disclosure.

In certain embodiments, the styrenic polymer may be admixed with additives prior to being used in end use applications. For example, the styrenic polymer may be admixed with fire retardants, antioxidants, lubricants, blowing agents, UV stabilizers, antistatic agents, and the like. Any additive known to those of ordinary skill in the art to be useful in the preparation of styrenic polymers may be used. $CO_2$ solubility, which is further discussed below, may increase for lower molecular weight polystyrene copolymer, therefore, it may be desirable to maintain or control the molecular weight of the styrenic copolymer. In an embodiment, chain transfer agents and/or diluents may be added before and/or during polymerization in order to help control the molecular weight of the resulting styrenic polymer.

In an embodiment, styrene monomer is combined with a second monomer and subsequently polymerized to form a polystyrene copolymer. The polystyrene copolymer may then be combined with a polar or non-polar additive to form a blend.

In an embodiment the second monomer may contain a polar or non-polar functional group. In another embodiment, the second monomer is a vinyl functional monomer. In another embodiment, the second monomer is selected from the group of hydroxyethylmethacrylate (HEMA), glycidyl methacrylate (GMA), polyvinyl acetate, esters, caprolactone acrylate, ethers, carboxylic acid, silane, fluorinated monomers, and oxygen-containing monomers, and combinations thereof. In a further embodiment, the second monomer is selected from the group of GMA, polyvinyl acetate, caprolactone acrylate, and HEMA, and combinations thereof. In another embodiment, the second monomer is HEMA.

The styrenic polymer may contain any desired amounts of a second monomer. In an embodiment, the second monomer is present in the reaction mixture of in amounts of at least 0.1 wt %. In an alternative embodiment, the second monomer is present in the reaction mixture is amounts ranging from 0.5 to 40 wt %. In another embodiment, the second monomer is present in the reaction mixture in amounts ranging from 0.5 to 20 wt %. In a further embodiment, the second monomer is present in the reaction mixture in amounts ranging from 0.5 to 10 wt %. In an even further embodiment, the second monomer is present in the reaction mixture in amounts ranging from 0.5 to 5 wt %.

In certain embodiments of the current disclosure, cellular polystyrene or polystyrenic foams are formed through extrusion, batch or injection molding with the polymer, water, and alumina, which acts as a carrying agent for the water. In other embodiments, multi-cellular polystyrene or polystyrenic foams are formed though extrusion, batch and injection molding of a polymer, a liquid that evaporates, decomposes, or reacts under the influence of heat to form a gas, and alumina. In still other embodiments, multi-cellular polystyrene or polystyrenic foams are formed through extrusion, batch and injection molding of a polymer, supercritical $CO_2$, water, and alumina.

Water is a good blowing agent for polystyrene or polystyrenic polymers in that it evaporates to form a gas, is inexpensive and is environmentally benign. However, the solubility of water in polymers such as polystyrene is very low. Without wishing to be bound by theory, it is believed that this low solubility can result in difficulties in obtaining a fine and uniform cell morphology. Previous attempts to remedy these difficulties include use of a surfactant and water-absorbing polymers to assist in carrying and dispersing water throughout the polymer. These attempts have met with very limited success.

Applicants have found that alumina ($Al_2O_3$) is effective as a carrier for water. Some of the water blowing agent is adsorbed on the hydrophilic and porous surface of the alumina ("adsorbed water"). In addition, some of the water remains as water droplets in the molten polystyrene ("free water"). The alumina functions as water adsorbent, water carrier, hydrophilic agent and/or liquid carrier for the liquid media.

Various sizes of alumina may be used. Typical readily available forms of alumina have the following properties: 5 to 150 microns in size, 4.5 to 60 nm crystallites, 95 to 360 $m^2/g$ surface area, and 0.3 to 1.2 ml/g pore volume. In certain embodiments, the alumina is approximately 60 microns and breaks up to sub-micron particles. The alumina generally has large surface area (e.g., at least 90 $m^2/g$).

Again, without wishing to be bound by theory, because the polystyrene or polystyrenic polymer is under high temperature and pressure during formation of the foam, the free water superheats and vaporizes to form the large cells. The free water trapped in the pores of the alumina desorbs and forms the smaller cells. It is believed that the superheated free water acts quickly compared to the desorbtion process. Alumina does not reduce the bubble size or increase the bulk density of the foam. In addition to acting as the carrier for water, the alumina may act as a nucleator.

In certain embodiments, alumina is added to reach a concentration of from about 0 to about 4 wt. % $Al_2O_3$. In other embodiments, alumina is added to reach a concentration of from about 0.5 to about 1.5 wt. %. In certain embodiments, water can be added to reach a concentration of from about 0 to about 3 wt. %. In certain other embodiments, water can be added to reach a concentration of from about 0.5 to about 1.5 wt. %.

Unexpectedly, alumina performs better than other adsorbents in carrying water for polymeric foams. For instance, as shown in K. Lee et al., J. Cellular Plastics, 2009, vol. 45 pp 539-553, *Bi-Cellular Foam Structure of Polystyrene from Extrusion Foaming Process*, which is incorporated by reference herein, at least 3 wt. % $SiO_2$ is needed to make bi-cellular foams with 1 to 2 wt. % water and butane as the blowing agent. In contrast, in the present disclosure, far less alumina is necessary to make a bi-cellular foam. Activated carbon, performs poorly as a water carrier. As shown in WO 2009/155066, the water was not bound well and flashed off in the extruder. The activated carbon results in non-uniform cell size distributions and many large voids were formed in the foam. Further, unlike activated carbon, which uses talc as a nucleating agent, nucleating agents are not required for alumina adsorbents.

Other embodiments of the present disclosure use organic compounds in place of water for combination with alumina as blowing agents. Typically, such organic compounds are liquid in order to be absorbed onto the alumina and carried by the alumina in the molten polymer. Thus, in certain embodiments, the organic compounds are liquid at room temperature. Further, the organic compound must be vaporous at formation temperatures of the polystyrene in order to form the cells. Examples of suitable organic compounds include butane, pentane, alcohols (including ethanol, propanols, butanols, and pentanols), halogenated hydrocarbons (including methylene chloride, dioctyl phthalate, etc.), dihydric alcohols, polyhydric alcohols, ketones, esters, amides, acids, aldehydes, or a mixture thereof.

In certain embodiments, surfactants, surfactant-like molecules and polymers may be used to assist dispersal of the water or liquid into the polymer. These materials include ionic surfactants including, but not limited to, anionic surfactants (typically based on sulfate, sulfonate, or carboxylate anions), bis(2-ethylhexyl) sulfosuccinate, sodium salt, sodium dodecyl sulfate (SDS), ammonium lauryl sulfate, and other alkyl sulfate salts, sodium laureth sulfate, also known as sodium lauryl ether sulfate (SLES), alkyl benzene sulfonate, soaps, and fatty acid salts; cationic surfactants (typically based on quaternary ammonium cations) including, but not limited to, cetyl trimethylammonium bromide (CTAB), a.k.a. hexadecyl trimethyl ammonium bromide, and other alkyltrimethylammonium salts, cetylpyridinium chloride (CPC), polyethoxylated tallow amine (POEA), benzalkonium chloride (BAC), benzethonium chloride (BZT), zwitterionic (amphoteric), dodecyl betaine, dodecyl dimethylamine oxide, cocamidopropyl betaine, and coco ampho glycinate; and nonionic surfactants including, but not limited to, alkyl poly(ethylene oxide), copolymers of poly (ethylene oxide), polypropylene oxide) (commercially called Poloxamers or Poloxamines), and alkyl polyglucosides, including, but not limited to: octyl glucoside, decyl maltoside, fatty alcohols, cetyl alcohol, oleyl alcohol, cocamide MEA, and cocamide DEA. The use of alumina typically obviates the need for these materials and in certain embodiments of the present disclosure, such materials are not used at all.

In still other embodiments, multi-cellular foams are formed though the use of supercritical $CO_2$ in combination with water and alumina. Like water, $CO_2$ is inexpensive and environmentally benign. $CO_2$ is an attractive replacement for the ozone-depleting blowing agents such as HCFCs because it is low-cost, non-toxic, nonflammable, and not regulated by the Environmental Protection Agency (EPA). Because $CO_2$ is environmentally benign, its use can eliminate the need of an expensive vacuum system to recover HCFC and HFC. In certain embodiments, $CO_2$ is added to reach a concentration of from about 2 to about 5 wt. % $CO_2$. In certain other embodiments, $CO_2$ is added to reach a concentration of from about 3 to about 4 wt. % $CO_2$. In other embodiments, instead of carbon dioxide, $N_2$, HCFCs, and HFCs are used as blowing agents.

Figure 2:
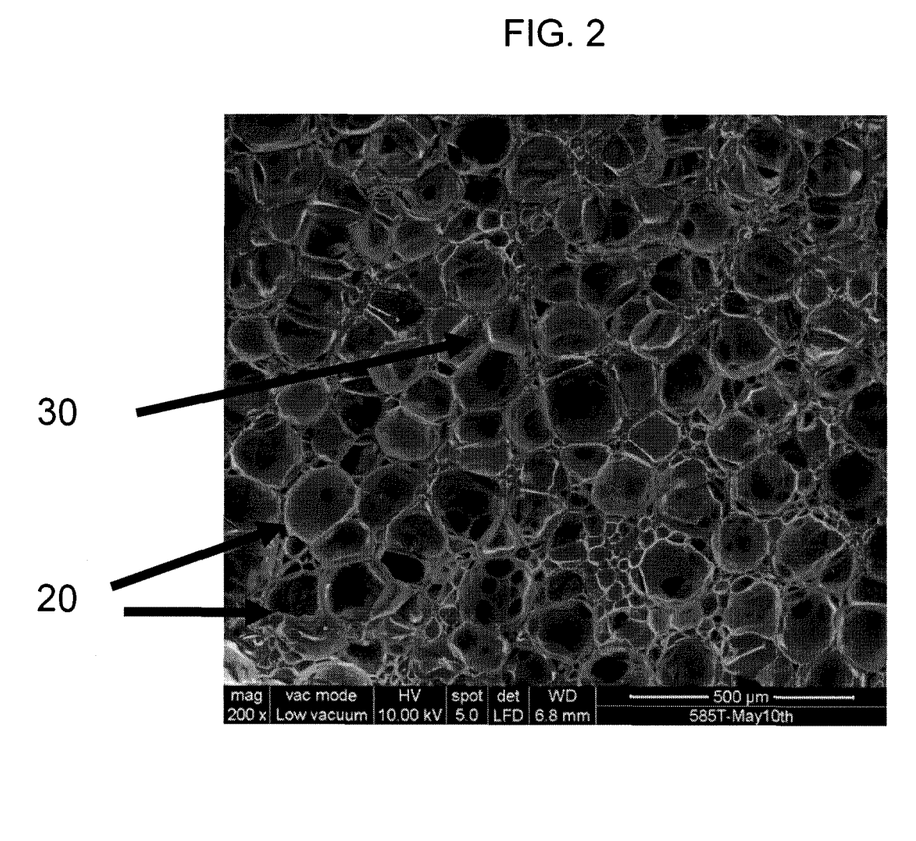
FIG. 2 is a SEM micrograph of expanded polystyrene foam manufactured in accordance with PS585T-A1 of the Example.
Figure 4:
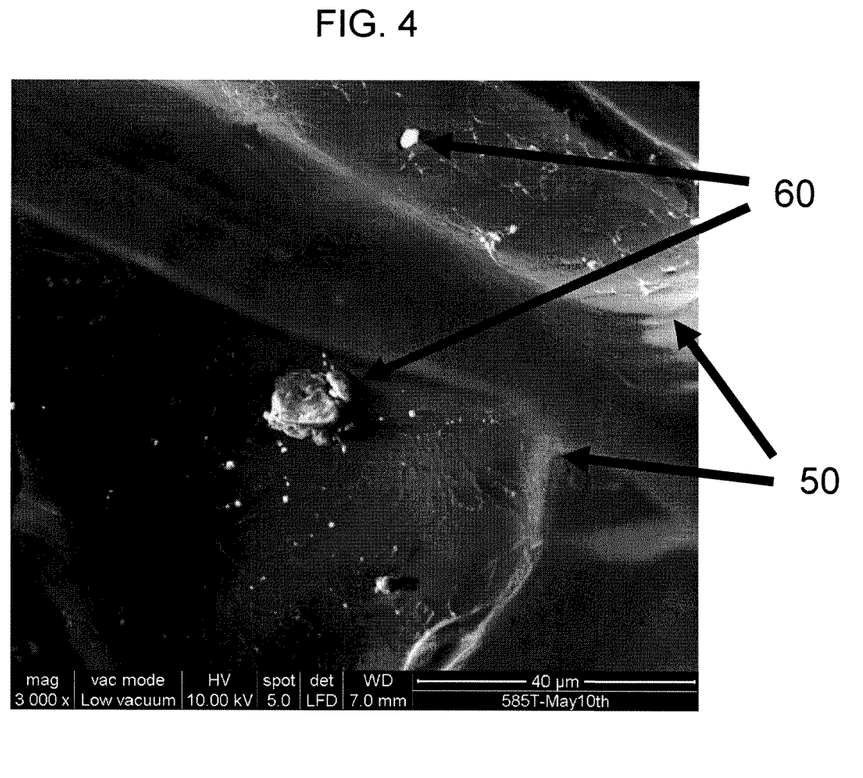
FIG. 4 is an enlarged SEM micrograph of expanded polystyrene foam

In certain embodiments wherein the blowing agents are $CO_2$ and water, the polystyrene or polystyrenic polymer foamed article has a multi-cellular size distribution. In certain embodiments, the average cell size of the cellular foam ranges from between about 20 to about 50 microns. In certain other embodiments, the average cell size of the cellular foam ranges from about 30 microns to about 40 microns. In some embodiments, the multi-cellular foam is bi-cellular, i.e., comprised of large cells and small cells. In certain embodiments, the small cells have an average cell size of less than about 50 microns. In certain other embodiments, the small cells have an average cell size of between about 5 and about 45 microns, while in still other embodiments the small cells have an average size of between about 25 and about 40 microns. In certain embodiments, the large cells have an average cell size of from about 150 to about 900 microns. Typically, as shown in Table 1 below, the average cell size is to a great extent dependent on the average small cell size due to the larger number of small cells with the small cells comprising nearly 90% of the total cells with the large cells making up the remaining 10%. In certain embodiments, some of the alumina is dispersed within the struts and cell walls and some of the alumina is present in small clusters within the cells. Cell walls 20 and struts 30 are shown in FIG. 2. Alumina particles 60 are depicted in FIG. 4 as incorporated into cell walls 50. Alumina particles 60 are typically less than one micron in size. The ratio of small cells to large cells and the average cell size of the large and small cells depends, in part, on the molecular weight of the polystyrene, the temperature at which the polystyrene is foamed, the blowing agent(s) used, and type and level of nucleators (where nucleators are present).

The polystyrene and polystyrenic foamed articles may further include reflective additives, such as those taught in WO 2009/155066, which is incorporated by reference herein, for further insulative properties. The reflective additives generally have a large particle size (e.g., a particle size of from 0.1 μm to 10 μm). In one or more embodiments, the reflective additive is inorganic, such as an IR reflective material. Furthermore, one or more specific embodiments utilize non-carbon containing additives (inorganic compounds) in contrast to the carbonaceous additives utilized in WO 2009/155066. It is believed that non-carbon containing additives may be utilized with a broader range of adsorbents, such as alumina.

Methods of forming the above polystyrene and polystyrenic foamed articles include using (i) alumina as water adsorbent water carrier, hydrophilic agent and/or liquid carrier for the liquid media, such as, for example, water, (ii) a polystyrene polymer including a polar group as water absorbent, water carrier, hydrophilic agent and/or liquid carrier for the liquid media or (iii) a combination of alumina and a polystyrene polymer including a polar group.

Extrusion polystyrene processes (for forming the polystyrene foamed articles) generally utilize a primary blowing agent and a secondary blowing agent comprising water. The adsorbent is expected to adsorb the secondary blowing agent, which is then released during subsequent expansion at a time other than release of the primary blowing agent, thereby forming smaller cells than that formed by the primary blowing agent, resulting in the multi-cellular distribution.

An optional embodiment contemplates co-polymerizing polar or non-polar monomers with styrene to form polystyrene having a novel backbone. Use of such polystyrene, either alone or in combination with the other embodiments described herein, is expected to form the desirable multi-cellular distribution discussed above.

In other embodiments, polymers other than polystyrene and polystyrenic polymers may be used. Such polymers include thermoplastic polyolefin (TPO), polystyrene/high-impact polystyrene (HIPS) blend, PMMA, HIPS, polyvinylchloride (PVA), maleic anhydride modified PP (poly propyl methacrylate (PPMA), polyethylene vinyl acetate (PEVA), acrylonitrile butadiene styrene (ABS), acrylic celluloid, cellulose acetate, ethylene-vinyl acetate (EVA), ethylene vinyl alcohol (EVAL), fluoroplastics (e.g., PTFE, FEP, PFA, CTFE, ECTFE, and ETFE), ionomers, Kydex (a trademarked acrylic/PVC alloy), liquid crystal polymer (LCP), polyacetal (e.g., POM and acetal), polyacrylates (acrylic), polyacrylonitrile (e.g., PAN and acrylonitrile), polyamide (e.g., PA and nylon), polyamide-imide (PAI), polyaryletherketone (PAEK or ketone), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polycarbonate (PC), polyhydroxyalkanoates (PHAs), polyketone (PK), polyester, polyethylene (PE), polyetheretherketone (PEEK), polyetherimide (PEI), polyethersulfone (PES), polysulfone, polyethylenechlorinates (PEC), polyimide (P1), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polyvinyl chloride (PVC), polyvinylidene chloride (PVDC), Spectralon (a commercially available resin), or a mixture of any of the foregoing.

The present disclosure may include foamed articles which may be formed by melting and mixing the polystyrene and styrenic copolymer blends to form a polymer melt, incorporating a blowing agent into the polymer melt to form a foamable blend, and extruding the foamable blend through a die to form the foamed structure. During melting and mixing, the polymeric material may be heated to a temperature at or above the glass transition temperature of the polymeric material. The melting and mixing of polymeric material and any additives may be accomplished by any means known in the art, including extruding, mixing, and/or blending. In an embodiment, a blowing agent is blended with molten polymeric material. The blending of the blowing agent with the molten polymeric material may be performed under atmospheric or elevated pressures.

In a non-limiting embodiment, either by itself or in combination with any other aspect of the disclosure, the blowing agents are incorporated into the polystyrene and styrenic copolymer in a weight proportion ranging from 1 to 30 parts per 100 parts of the polymeric material to be expanded. In another embodiment, the blowing agents are incorporated into the polystyrene and styrenic copolymer in a weight proportion ranging from 2 to 20 parts per 100 parts per polymeric material to be expanded. In a further embodiment, the blowing agents are incorporated into the styrenic copolymer in a weight proportion ranging from 4 to 12 parts per 100 parts per polymeric material to be expanded.

The foamable blend may be cooled after the blowing agents are incorporated into the styrenic blend to obtain the foamable blend. In an embodiment, the foamable blend is cooled to temperatures ranging from 80 to 180° C., optionally 100 to 150° C. The cooled foamable blend may then be passed through a die into a zone of lower pressure to form an expanded blend, article, or other foamed structure. The use of the polystyrene and polystyrenic copolymers can also be used for not only foams, but also for rigid blends.

The obtained expanded polystyrene or polystyrenic copolymers may have any desired density. In an embodiment, the density of the expanded polystyrene copolymer ranges from 15 to 0.1 lbs/ft$^3$. In another embodiment, the density of the expanded polystyrene or polystyrenic copolymer ranges from 10 to 0.5 lbs/ft$^3$. In a further embodiment, the density of the expanded polystyrene or polystyrenic copolymer ranges from 3 to 0.6 lbs/ft$^3$.

An end use article may include a blend. In an embodiment, the articles include films and thermoformed or foamed articles. For example, a final article may be thermoformed from a sheet containing the blend. In another embodiment, the end use articles include foamed articles, which may have a foamed structure. In an embodiment, an article can be obtained by subjecting the polymeric composition to a plastics shaping process such as extrusion. The polymeric composition may be formed into end use articles including food packaging, food/beverage containers, polymeric foam substrate, foamed insulation, building insulation, protective head gear, toys, dunnage, and the like.

In an embodiment, the obtained polystyrene or polystyrenic foam is a multi-cellular article having a plurality of cells that may be open or closed. In another embodiment, the majority of the cells are open. In a further embodiment, the majority of the cells are closed.

EXAMPLES

In non-limiting Examples of the present disclosure, Total Petrochemicals Polystrene 585T and Polystyrene CX5243 are used. The baseline resins were extrusion foamed as received.

$Al_2O_3$ Pre-treatment. Catapal C1 (the alumina) available from Sasol was used. Catapal C1 has a reported particle size of 60 microns, surface area of 230 m2/g, and a 0.50 ml/g pore volume. The alumina particles comprise 5.5 nm crystallites. The Catapal C1 was heated in a forced air oven at 145 C for a minimum of 2 hours to remove any physically adsorbed water before blending with the polystyrene pellets.

In one embodiment PS 585T-Al is prepared. To 14.2 pounds of PS 585T ca. 64 grams (1.0 wt. %) of deionized water were added and the mixture tumble blended until the water was well dispersed on the pellets. 70 grams (ca. 1.1 Wt. %) of dried Catapal C1 were then added and tumble blended until well dispersed and the mixture appeared dry due to adsorption of the water by the alumina.

For PS 585T, as shown in Table 1 below, the same process was performed, expect no alumina was added.

In a second embodiment, PS CX5243-A1 is prepared. To 15.0 pounds of PS CX5243 ca. 102 grams (1.5 wt. %) of deionized water were added and the mixture tumble blended until the water was well dispersed. To this mixture, 90 grams (ca. 1.3 wt. %) of dried Catapal C1 were then added and tumble blended until well dispersed. After approximately 30 minutes of blending, there appeared to be some free water that was not adsorbed by the alumina. The mixture was allowed to stand overnight exposed to atmosphere to evaporate excess water.

For PS CX5243, as shown in Table 1 below, the same process was performed, except no alumina was added.

Extrusion Foaming. In both embodiments, a Killion-Davis Standard tandem foam extrusion line was used for extrusion foaming. The setup consisted of a primary extruder with a ¾", 34:1 single-stage feed screw with a mixer designed for $CO_2$ injection. The secondary extruder was a 1½", 30:1 Davis-Standard foam configuration. Carbon dioxide was delivered using a MuCell pump designed for the injection of $CO_2$ and $N_2$. A 0.200" diameter rod die was used in both embodiments.

Foam Analyses. Scanning electron microscopy was employed to evaluate the cell structures of the polystyrene foams. The SEM was equipped with EDS in order to determine the location and size of the dispersed alumina particles. Image analyses were employed to measure the cell sizes and distributions. Samples for SEM were cryofractured prior to analyses. Foam densities, open cell and closed cell data were obtained using a pycnometer.

The experimental conditions of the first and second embodiments, as well as the results, are summarized in Table 1.

TABLE 1

| Sample | PS585T | PS585T-Al | CX5243 | CX5243-Al |
|---|---|---|---|---|
| Water Content (Wt. %) | 0 | 1.0 | 0 | 1.5 |
| Alumina Content (Wt. %) | 0 | 1.1 | 0 | 1.3 |
| Extruder Throughput (pph) | 6.6 | 5.3 | 6.5 | 6.1 |
| $CO_2$ Concentration (Wt. %) | 3.4 | 3.6 | 3.3 | 3.1 |
| Die Exit Temperature (F.) | 247 | 220 | 233 | 230 |
| Head Pressure (psi) | 1,474 | 1,700 | 2,135 | 2,816 |
| Foam Density (g/cc) | 0.0764 | 0.1160 | 0.0748 | 0.0737 |
| Expansion Ratio | 13.6 | 9.0 | 13.9 | 14.1 |
| Percent Open Cells | 5.0 | 0.0 | 5.6 | 6.6 |
| Average Small Cell Size (microns) | N/A | 26 | N/A | 38 |
| Average Large Cell Size (microns) | N/A | 137 | N/A | 636 |
| Average Cell Size (microns) | 372 | 29 | 900 | 40 |
| Cell Size Ratio (large to small) | N/A | 5.3 | N/A | 16.7 | i The volume expansion ratio is taken as the ratio of the non-foamed PS bulk density to the foamed PS bulk density.
ii The open and closed cell content was determined from a pycnometer. The numbers reported are uncorrected values and the open cell percent is generally believed to be due to the open cells along the fracture surface.

Figure 1:
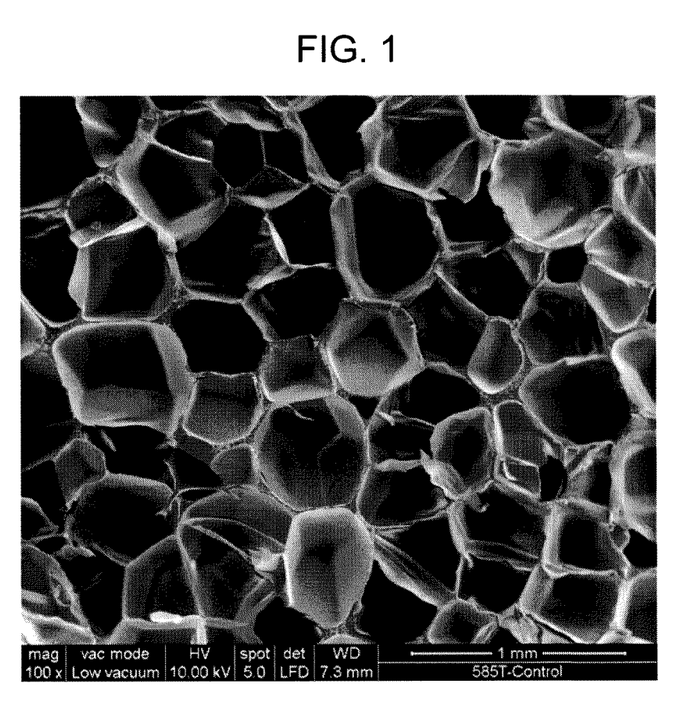
FIG. 1 is a SEM micrograph of expanded polystyrene foam manufactured in accordance with PS585T of the Example.

FIG. 1 is a micrograph of Sample PS 585T. As is shown in FIG. 1, the $CO_2$ blowing agent forms only large cells, which as shown in Table 1, have an average cell size of 372 microns. FIG. 2 is a micrograph of Sample PS 585T-Al. As can be seen in FIG. 2, and as confirmed by Table 1, the addition of the adsorbent alumina and the second blowing agent, water reduced the size of the large cells and caused the formation of large number of small cells. Cell walls 20 and strut 30 are depicted in FIG. 2.

Figure 3A:
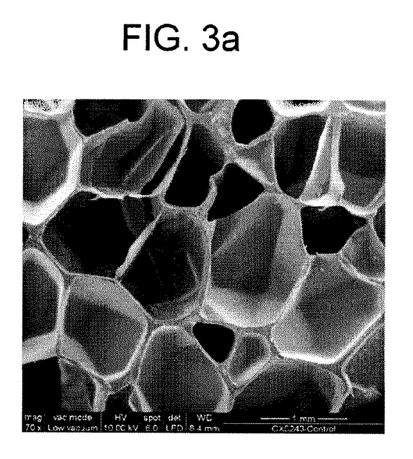
FIG. 3a is a SEM micrograph of expanded polystyrene foam manufactured in accordance with PSCX5243 of the Example.
Figure 3B:
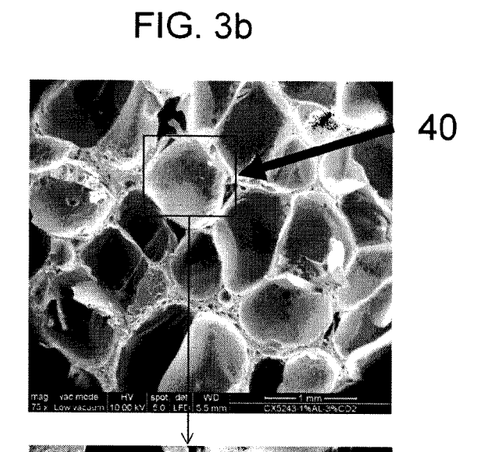
FIG. 3b is a SEM micrograph of expanded polystyrene foam manufactured in accordance with PSCS5243-A1 of the Example.
Figure 3C:
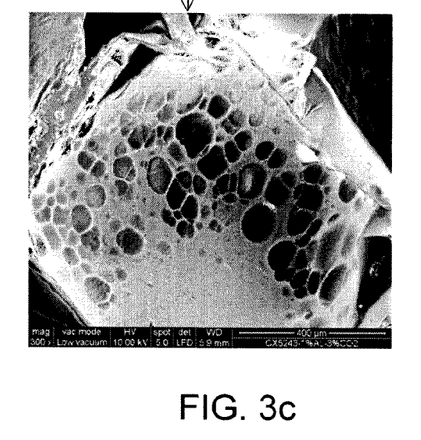
FIG. 3c is an enlarged SEM micrograph of the expanded polystyrene foam of FIG. 3b.

FIG. 3a is a micrograph of Sample CX5243. As is shown in FIG. 3a, the $CO_2$ blowing agent forms only large cells, which as shown in Table 1, have an average cell size of 900 microns. FIG. 3b is a micrograph of Sample CX5243-Al. As can be seen in FIG. 3b, and as confirmed by Table 1, the addition of the adsorbent alumina and the second blowing agent, water reduced the size of the large cells and caused the formation of large number of small cells. FIG. 3c is an enlarged micrograph of the section of FIG. 3b shown within box 40. FIG. 3c further shows the smalls cells formed from the use of alumina and water.

FIG. 4 is an enlarged micrograph of cell walls 50 from the Sample PS 585T-Al foam. Alumina particles 60 are incorporated into cell walls 50.

While the foregoing is directed to embodiments of the present disclosure, other and further embodiments of the disclosure may be devised without departing from the basic scope thereof and the scope thereof is determined by the claims that follow.

What is claimed is:

1. Multi-cellular polystyrene comprising:
expanded polystyrene formed from expansion of a blend comprising an expandable polystyrene, at least one blowing agent, wherein the at least one blowing agent is water, or water and carbon dioxide, and an adsorbent comprising alumina, wherein the multi-cellular polystyrene is bi-cellular comprising small cells and large cells, wherein the small cells have an average cellular size of between 25 and 40 microns, large cells have an average cellular size of from about 150 to about 900 microns, and wherein the number of the small cells having an average cellular size of between 25 and 40 microns is about 90% of a total of the number of the small cells and the large cells.

2. The multi-cellular polystyrene of claim 1, wherein the expandable polystyrene comprises a reflective additive having a particle size of between 0.1 μm to 10 μm.

3. The multi-cellular polystyrene of claim 1, wherein the multi-cellular polystyrene comprises struts and cell walls, and wherein the alumina is dispersed within the struts and cell walls, wherein the alumina has broken into sub-micron particles.

4. The multi-cellular polystyrene of claim 1, wherein the alumina is between 5 and 150 microns in size.

5. The multi-cellular polystyrene of claim 1, wherein the adsorbent exhibits a surface area of at least 90 $m^2/g$.

6. The multi-cellular polystyrene of claim 1, wherein no surfactant is present in the multi-cellular polystyrene.

7. The multi-cellular polystyrene of claim 1, wherein the $CO_2$ is supercritical $CO_2$.

8. The multi-cellular polystyrene of claim 1, wherein $CO_2$ is present in the blend at a concentration of from about 2 wt. % to about 5 wt. %, wherein the water is present in the blend at a concentration of from about 0.5 wt. % to about 3 wt. %, and wherein the alumina is present in the blend in an amount ranging from about 0.5 to about 4 wt. %.

9. The multi-cellular polystyrene of claim 1, wherein a portion of the water is present as free water in the blend, and wherein a portion of the water in the blend is absorbed on the alumina.

10. The multi-cellular polystyrene of claim 9, wherein the expanded polystyrene is formed under conditions sufficient to vaporize the free water to form large cells in the expanded polystyrene and to desorb the absorbed water to form small cells in the expanded polystyrene.

11. The multi-cellular polystyrene of claim 1, wherein a majority of cells in the multi-cellular polystyrene are closed.

12. Multi-cellular polystyrene comprising:
expanded polystyrene formed from expansion of a blend comprising an expandable polystyrene, at least one blowing agent, wherein the at least one blowing agent is water, or water and carbon dioxide, and alumina, wherein the multi-cellular polystyrene is bi-cellular comprising small cells and large cells, wherein the small cells have an average cellular size of between 25 and 40 microns, large cells have an average cellular size of from about 150 to about 900 microns, and wherein the number of the small cells having an average cellular size of between 25 and 40 microns is about 90% of a total of the number of the small cells and the large cells.

13. An article comprising:
Bi-cellular expanded polystyrene comprising small cells and large cells, wherein the expanded polystyrene is formed from expansion of a blend comprising an expandable polystyrene, water, and alumina, wherein a portion of the water is present as free water in the blend, wherein a portion of the water in the blend is absorbed on the alumina, and wherein the expanded polystyrene is formed under conditions sufficient to vaporize the free water to form the large cells in the expanded polystyrene and to desorb the absorbed water to form the small cells in the expanded polystyrene, wherein the small cells have an average cellular size of between 25 and 40 microns, large cells have an average cellular size of from about 150 to about 900 microns and wherein the number of the small cells having an average cellular size of between 25 and 40 microns is about 90% of a total of the number of the small cells and the large cells.

14. The multi-cellular polystyrene of claim 1, wherein the expandable polystyrene is a copolymer of styrene monomers and comonomers selected from the group consisting of hydroxyethylmethacrylate, glycidyl methacrylate, polyvinyl acetate, caprolactone acrylate, and combinations thereof.

* * * * *